United States Patent [19]
Reichner

[11] Patent Number: 5,922,365
[45] Date of Patent: Jul. 13, 1999

[54] APPARATUS FOR DIP-MOLDING AND ENCLOSED LOOP

[76] Inventor: Patrick Ernest Reichner, 15355 S. Bradley Rd., Oregon City, Oreg. 97045-8218

[21] Appl. No.: 08/986,909

[22] Filed: Dec. 8, 1997

Related U.S. Application Data

[60] Provisional application No. 60/056,345, Aug. 18, 1997.
[51] Int. Cl.$^6$ .......................... B29C 33/44; B29C 41/40
[52] U.S. Cl. .................................. 425/275; 264/303
[58] Field of Search .................... 425/275, 274, 425/269; 264/303, 304

[56] References Cited

U.S. PATENT DOCUMENTS

| | | | |
|---|---|---|---|
| 2,053,357 | 9/1936 | Winder | 425/275 |
| 2,451,758 | 10/1948 | Malm | 425/275 |
| 5,133,923 | 7/1992 | Klug | 425/275 |
| 5,380,182 | 1/1995 | Packard et al. | 425/275 |

*Primary Examiner*—Robert Davis
*Attorney, Agent, or Firm*—Marger Johnson & McCollom

[57] ABSTRACT

An apparatus and method is disclosed for forming enclosed loops in plastic parts using a mandrel-dip method. A mandrel is formed with a loop attached to the mandrel at one end, but separated from the mandrel at the other end by a gap. The process for forming the plastic part with an enclosed loop includes heating and dipping the mandrel into a vat containing a plastic or other resin and allowing the resin to bridge the gap in the loop. Once the resin cures, the mandrel is removed from the resin by injecting air into the plastic part between the mandrel and the plastic part. By doing so, the mandrel easily separates from the plastic part without needing to cut the mandrel or the plastic part.

2 Claims, 2 Drawing Sheets

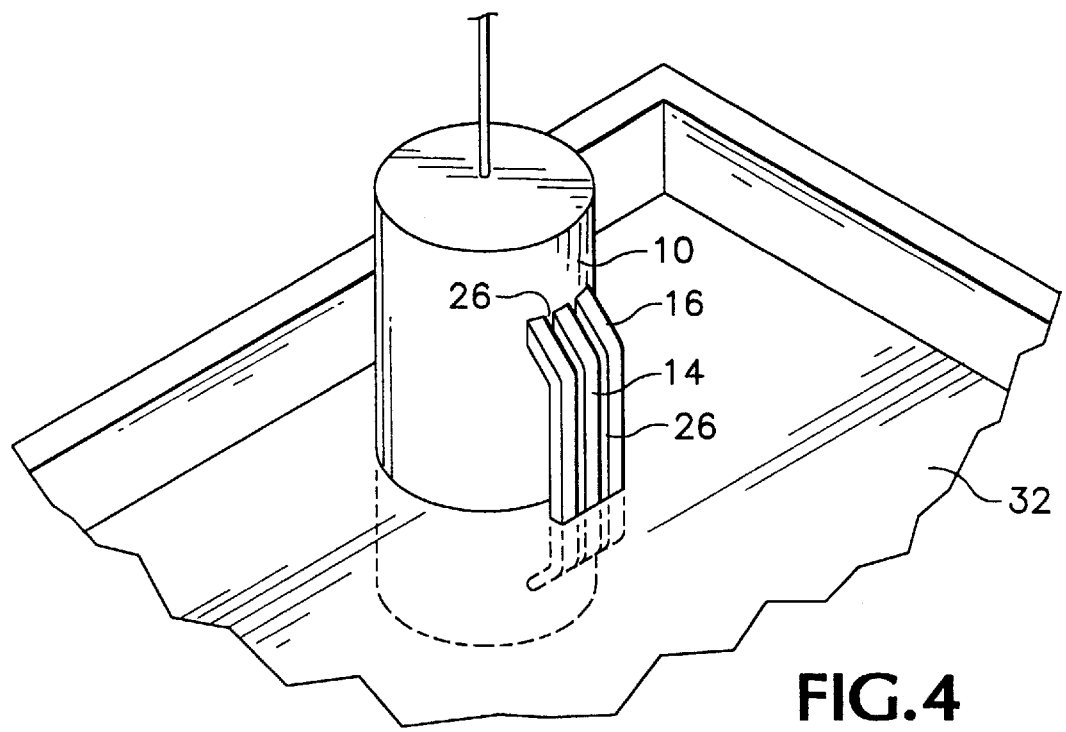
FIG. 4
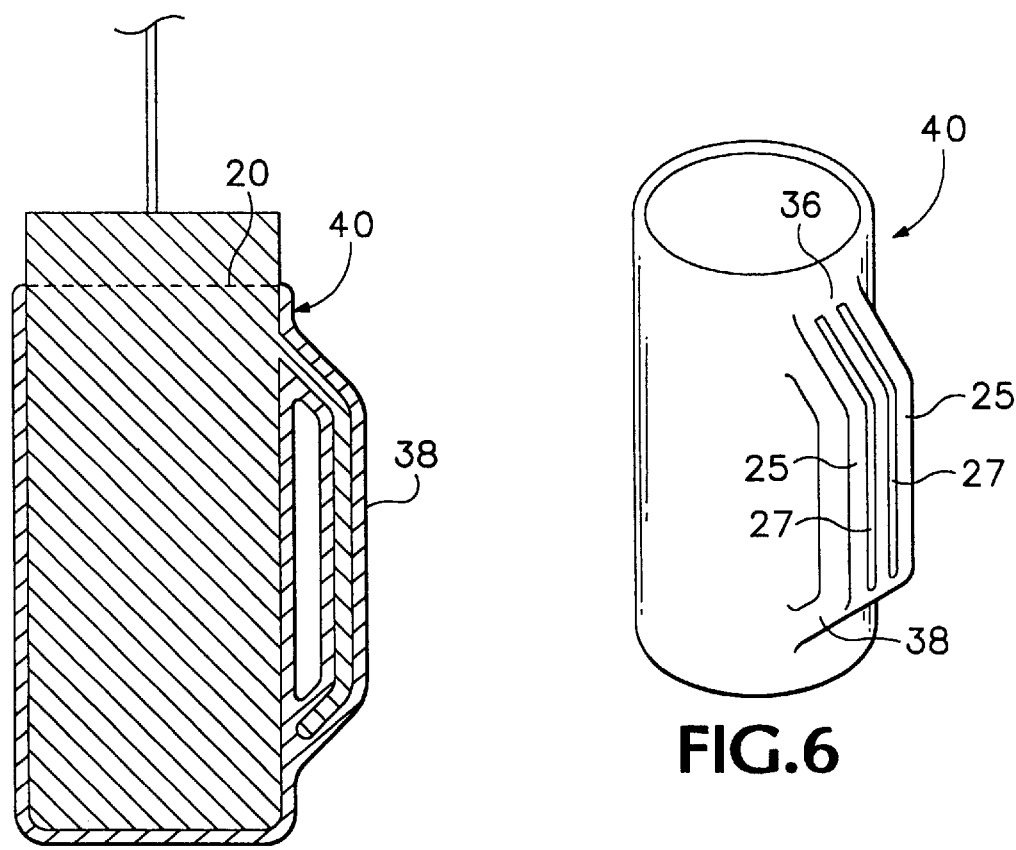
FIG. 5
FIG. 6

APPARATUS FOR DIP-MOLDING AND ENCLOSED LOOP

This application claims the benefit of U.S. Provisional application Ser. No. 60/056,345, filed Aug. 18, 1997.

BACKGROUND OF THE INVENTION

This invention relates generally to methods for molding plastics. More specifically, this invention relates to a mandrel-dip method for molding plastic products containing enclosed loops.

PVC or other plastic parts molded using the mandrel-dip method have traditionally been unable to efficiently contain enclosed loops. In the traditional mandrel-dip method, a mold or mandrel is heated to 300–400 degrees fahrenheit and then dipped into room temperature plastic resin. The plastic is attracted to the heated mandrel, attaches to the mandrel, and cures with the heat. As the plastic resin cools around the mandrel, it attains the form of the mandrel or mold.

To produce loops in plastic molded parts, it has traditionally been necessary to use a mandrel or mold having an enclosed loop. The mandrel having the enclosed loop is heated then dipped into room temperature plastic resin, the resin surrounds the mandrel loop in accordance with the above-described procedure. A disadvantage of using this process to produce plastic parts having continuous enclosed plastic loops is that once the resin has coagulated around the mold and set, the mold cannot be separated directly from the resulting plastic part. In order to separate the plastic from the mold, it is necessary either to cut the plastic part or break or sever the enclosed mandrel loop.

The industry has been unable to use the mandrel-dip method of plastic molding to mold polyvinyl chloride (PVC) or other plastics into parts having enclosed loops without requiring the destruction of the mandrel, cutting of the plastic part, or breaking the enclosed mandrel loop. Destruction of the mandrel in order to remove the plastic part is time consuming and expensive because mandrels or molds are costly and meant to be re-used to make other plastic parts. Cutting the plastic part in order to remove it from the mold is disadvantageous for several reasons. Not only is it a tedious process, it also reduces the strength of the loop and thus the longevity of the overall part. Breaking the enclosed mandrel loop is undesirable because once the loop has been severed, the mandrel must either be repaired or replaced before it can be used to make another part.

Therefore, there is a need for an apparatus and method for molding PVC and other plastic parts having continuous enclosed loops using the mandrel-dip method in which the mandrel can be removed from the plastic part without destroying or damaging the mandrel or mold, cutting the plastic part, or breaking the enclosed mandrel loop.

The industry would also be benefitted by plastic parts having enclosed loops that offer increased strength and resiliency.

SUMMARY OF THE INVENTION

An object of the present invention is therefore to enable the formation of a continuous enclosed loop in a molded plastic part which allows direct removal of the mandrel from the part without requiring cutting the plastic part or breaking the mold.

Another object of the present invention is to increase the strength and longevity of enclosed molded loops.

This invention provides a significant improvement in the art by enabling a reusable mold to produce plastic products having enclosed loops without having to cut the resulting plastic part or destroying the mold. The invention accomplishes this by realizing that plastic resin can bridge small gaps in the mandrel. Thus, a mandrel with a loop having a small gap at one end between the mandrel loop and the mandrel body is provided. When such a mandrel is dipped into plastic resin, the plastic bridges the gap left between the mandrel loop and body. A plastic part made in this manner allows the separation of the part from the mandrel without rupturing the plastic member or breaking the mold.

Additionally, the invention provides a molded loop with increased strength because it does not need to be severed and reattached to the body of the plastic part. Even if a continuous molded loop is not desired in the finished product, when the molded loop is cut away from the body of the molded part, the cut end of the loop has added strength because the plastic flows across and bridges the mandrel gap, causing plastic to cluster forming a solid mass around the gap thereby strengthening that end of the plastic part. More significantly, however, it provides enhanced strength by providing multiple adjacent molded loop members. By providing a mandrel or mold with multiple adjacent loops, the loops having gaps at first ends between the first ends and the mandrel body and slits in between each adjacent loop, the resin not only bridges the gap at first ends as described above to form the enclosed loop but collects in the slits between the loop members. By doing so, a non-hollow, continuous segment is formed between the separate multiple adjacent loops which provides greater strength and longevity to the overall loop.

The foregoing and other objects, features, and advantages of the invention will become more readily apparent from the following detailed description of a preferred embodiment of the invention which proceeds with reference to the accompanying drawings.

BRIEF DESCRIPTION OF THE DRAWINGS

FIG. 4 is a perspective view of a mandrel being dipped into a vat of resin.

FIG. 5 is side section view of the mandrel of FIG. 4 coated resin.

FIG. 6 is perspective view of the finished product resulting from dipping the mandrel into a vat of resin as shown in FIGS. 4 and 5.

DETAILED DESCRIPTION OF A PREFERRED EMBODIMENT

Figure 1:
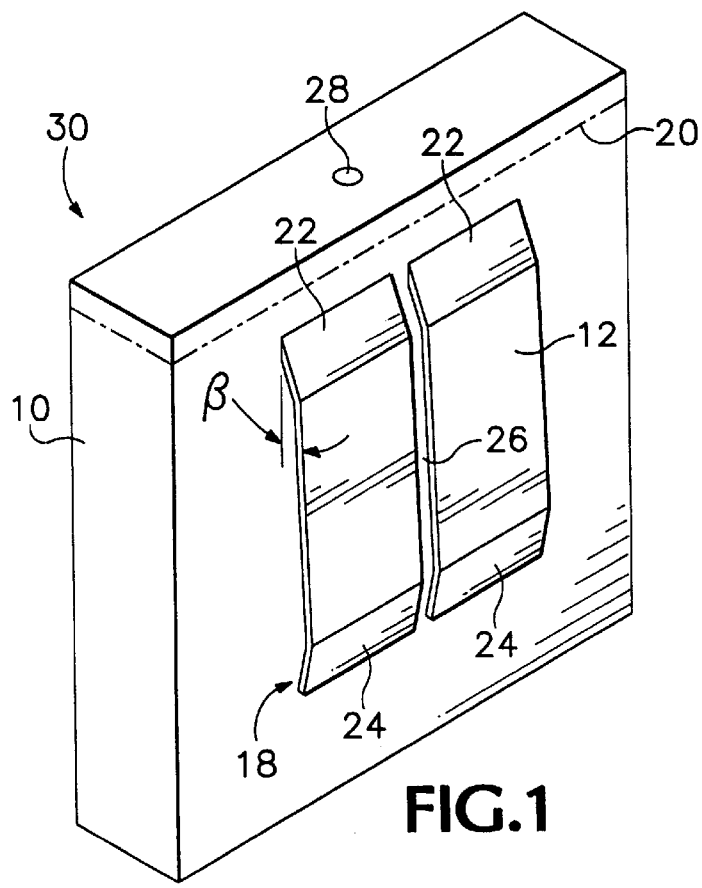
FIG. 1 is a perspective view of the mandrel according to one embodiment of this invention.

Referring to FIG. 1, a preferred embodiment of this invention includes a mandrel 30 of a desired shape comprising a mandrel body 10 and loop 12. The shape of mandrel body 10 determines the shape of the resulting plastic part since the plastic resin 32 attaches and surrounds mandrel 30. Thus, the rectangular mandrel 30 shown in FIG. 1 will produce a rectangular shaped plastic part. A cylindrical mandrel (not shown) will produce cylindrical shaped plastic part 40 shown in FIG. 6. The present invention envisions mandrels of a variety of shapes and sizes for producing plastic products with enclosed loops having a variety of shapes, sizes, and uses. The shape of mandrel 30 shown in FIG. 1 is for the purpose of example only and should not be interpreted as limiting the invention in any way.

Mandrel 30 includes a mandrel body 10. Body 10 is typically made of a solid piece of steel or aluminum to provide even heating throughout and long use. Body 10 can include a threaded orifice 28 for receiving a screw that attaches mandrel 30 to a handle, machine, or other tool (not shown) for facilitating the dipping of mandrel 30 into a vat or a container of plastic resin like vat 32 shown in FIG. 4.

Mandrel loop 12 has a first end 22 attached to and extending out from body 10. The shape of loop 12, including angle P at which loop 12 extends out from body 16 and length l of loop 12, depend on the requirements for the resulting loop. Thus, if a long loop 12 is desired, length l of loop 12 can be extended without departing from the scope of this invention. Loop 12 has a second end 24 which is not attached to body 16. As will be explained further below, the shape of second end 24 of loop 12, including angle β, typically mirrors first end 22 with the exception that second end 24 remains spaced from mandrel body 10. This is so because a plastic part having a uniform enclosed loop is typically desired. However, if a non-uniform enclosed loop is desired, second end 24 need not mirror first end 22.

Referring to FIGS. 2–6, mandrel loop 12 is separated from mandrel body 10 by loop gap 18. Best results are obtained when loop gap 18 is approximately ¼ inch or less wide. Loop gap 18 is formed between loop 12 and body 10 to permit plastic resin 32 to flow and bridge loop gap 18 thereby forming a continuous enclosed loop like loop 38 in plastic part 40 as is best seen with reference to FIG. 6. By forming loop 12 in such a fashion, an enclosed loop 38 is made possible without requiring a mold or mandrel also having an enclosed loop. Once cooled, the plastic part 40 having a continuous enclosed loop 38 is easily separated from mandrel 30 by injecting air between the plastic part 40 and mandrel 30. The injected air detaches the inside walls of plastic part 40 from mandrel body 10 and loop 12. Since loop 12 is not attached at second end 24 to body 10, the mandrel is easily separated and removed from plastic part 40. Since mandrel 30 is not cut or otherwise damaged in this process, mandrel 30 is ready to be re-used to mold another plastic part having a continuous enclosed loop.

Figure 2:
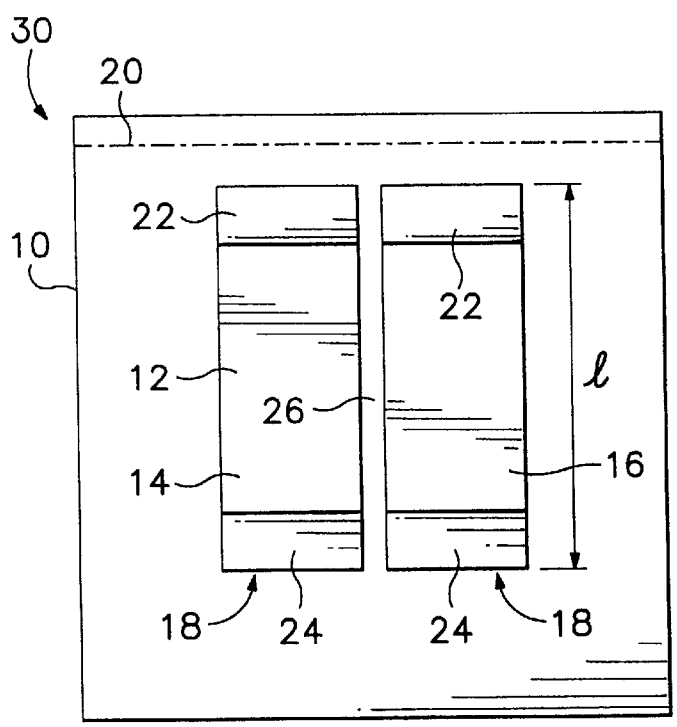
FIG. 2 is a front plan view of the mandrel of FIG. 1.

As shown in FIGS. 2 and 6, mandrel loop 12 may have multiple adjacent loop members 14 and 16 separated by slits 26. Mandrel 30 having multiple loop members 14 and 16 provide enhanced strength to mandrel loop 12 in part 40. Mandrel 30 includes multiple adjacent loop members 14 and 16 having loop gaps 18 at second ends 24 between second ends 24 and mandrel body 10 and slit 26 in between adjacent loop members 14 and 16. After the mandrel is heated and dipped into resin 32 as shown in FIG. 4, resin 32 not only bridges gap 18 at second ends 24 to form the continuous enclosed loop but collects in slit 26 between loop members 14 and 16. By doing so, a continuous membrane is formed from the separate multiple adjacent loops. The loops' non-hollow members 25 resulting from the collecting resin in slit 26 adjacent to hollow members resulting from the resin surrounding loop members 14 and 16 which provides greater strength and longevity to the overall loop.

The use of loop members 14 and 16 and slit 26 has the added advantage of forming aesthetically pleasing dips 36 to achieve a plastic part having a contoured enclosed loop 38. The number of loop members can vary depending on the desired width, strength, and aesthetics of the plastic 38 loop formed from the mold.

Figure 3:
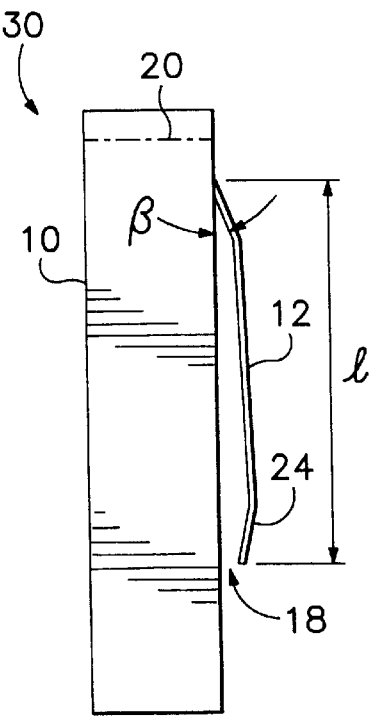
FIG. 3 is a side plan view of the mandrel of FIG. 1.

Referring to FIGS. 3 and 4, mandrel 30 is first wiped or dipped into a releasing agent, such as silicon. The mandrel 30 is then heated to substantially 300 to 400 degrees fahrenheit. Once heated, mandrel 30 is introduced or "dipped" into a vat or container 32 of room temperature plastic or other resin 32. Dip line 20 indicates the point to which the mandrel 30 is introduced into the plastic resin 32. Plastic resin 32 flows across and bridges loop gap 18 between mandrel loop 12 and body 10 thereby closing the loop and producing a plastic part having a continuous enclosed loop 38 like plastic part 40 shown in FIG. 6. Plastic resin 32 also collects in slit 26 between loop members 14 and 16, as described above. Referring to FIG. 5, when the resin 32 bridges loop gap 18 and slit 26, mandrel 30 is removed from vat 32 and heat cured. Once cured, mandrel 30 is readily separated from the plastic by first blowing air between the mandrel 30 and the now solidified plastic resin 32. The result of this process is a plastic part 40 shown in FIG. 6 having a continuous enclosed loop without the need for destroying, modifying, cutting, or otherwise affecting mandrel 30 or plastic part 40. The enclosed loop formed in this manner has increased strength because the loop does not need to be severed and reattached to the body of the plastic part.

Having described and illustrated the principles of the invention in a preferred embodiment thereof, it should be apparent that the invention can be modified in arrangement and detail, by one skilled in the art, without departing from such principles. I, therefore, claim all modifications and variations coming within the spirit and scope of the following claims.

What is claimed is:

1. A mandrel for forming a continuous enclosed loop on a molded part, the mandrel comprising:

a mandrel body for dipping into a resin and forming a body of the molded part; and a mandrel loop having a first end fixedly connected to the mandrel body and a second end forming a gap between the mandrel body so that dipping the mandrel causes the resin to bridge said gap forming an enclosed loop integrally molded into the body of the molded part, said mandrel loop comprising a plurality of adjacent loop members.

2. A mandrel according to claim 1 wherein the plurality of adjacent loop members are separated from each other by a lengthwise slit forming a continuous rib between the adjacent loop members when the mandrel is heated and dipped into the resin.

\* \* \* \* \*